US007340403B1

(12) United States Patent
DeMarcken

(10) Patent No.: US 7,340,403 B1
(45) Date of Patent: Mar. 4, 2008

(54) METHOD, SYSTEM, AND COMPUTER-READABLE MEDIUM FOR GENERATING A DIVERSE SET OF TRAVEL OPTIONS

(75) Inventor: Carl G. DeMarcken, Cambridge, MA (US)

(73) Assignee: ITA Software, Inc., Cambridge, MA (US)

( * ) Notice: Subject to any disclaimer, the term of this patent is extended or adjusted under 35 U.S.C. 154(b) by 0 days.

(21) Appl. No.: 09/431,699

(22) Filed: Nov. 1, 1999

(51) Int. Cl.
*G06Q 10/00* (2006.01)
(52) U.S. Cl. .................................. 705/5; 705/6; 707/2
(58) Field of Classification Search .................. 705/5, 705/6; 707/2
See application file for complete search history.

(56) References Cited

U.S. PATENT DOCUMENTS

| | | | |
|---|---|---|---|
| 4,862,357 A * | 8/1989 | Ahlstrom et al. ........... 417/356 |
| 5,021,953 A | 6/1991 | Webber et al. | |
| 5,177,684 A | 1/1993 | Harker et al. | |
| 5,237,499 A | 8/1993 | Garback | |
| 5,253,166 A | 10/1993 | Dettelbach et al. | |
| 5,255,184 A | 10/1993 | Hornick et al. | |
| 5,331,546 A * | 7/1994 | Webber et al. ................ 705/6 |
| 5,422,809 A | 6/1995 | Griffin et al. | |
| 5,570,283 A | 10/1996 | Shoolery et al. | |
| 5,623,413 A | 4/1997 | Matheson et al. | |
| 5,644,721 A | 7/1997 | Chung et al. | |
| 5,732,398 A * | 3/1998 | Tagawa ........................ 705/26 |
| 5,794,172 A | 8/1998 | Matheson et al. | |
| 5,797,127 A | 8/1998 | Walker et al. | |
| 5,832,451 A * | 11/1998 | Flake et al. .................... 705/5 |
| 5,832,453 A | 11/1998 | O'Brien | |
| 5,832,454 A | 11/1998 | Jafri et al. | |
| 5,838,973 A | 11/1998 | Carpenter-Smith et al. | |
| 5,897,620 A | 4/1999 | Walker et al. | |
| 5,948,040 A | 9/1999 | DeLorme et al. | |
| 6,119,094 A | 9/2000 | Lynch et al. | |
| 6,295,521 B1 * | 9/2001 | DeMarcken et al. ........... 705/6 |
| 6,377,932 B1 * | 4/2002 | DeMarcken .................. 705/1 |
| 6,442,537 B1 * | 8/2002 | Karch ........................ 706/50 |

FOREIGN PATENT DOCUMENTS

| | | |
|---|---|---|
| EP | 0 451 371 | 10/1991 |
| EP | 0 762 306 A2 | 3/1997 |
| WO | WO 89/07798 | 8/1989 |

OTHER PUBLICATIONS

Stolz, Craig, Travel Insider; New Web site Beats Rivals at Finding at Finding Low Air Fares; Internet * A recently debuted search tool is a winner at locating good prices, wide choice in domestic flights.; Los Angeles, Calif.: Dec. 26, 1999. p. 2.*
"Towards desktop personal travel agents", D.T. Ndumu, J.C. Collis and H.S. Nwana, BT Technol. J., vol. 16, No. 3, Jul. 1998, pp. 69-78.

* cited by examiner

*Primary Examiner*—Jeffrey A. Smith
*Assistant Examiner*—R. David Rines
(74) *Attorney, Agent, or Firm*—Fish & Richardson P.C.

(57) ABSTRACT

A method for generating a diverse list of N travel options Rts from a larger list of travel options Ts, is described. The method includes generating a prioritized ordered list of requirements Rs and sorting the list of travel options Ts by an ordering function F to produce a best-first ordered list Ts2 with the list of options being optimized travel options for a set of travel requirements R in accordance with the ordering function F.

45 Claims, 6 Drawing Sheets

METHOD, SYSTEM, AND COMPUTER-READABLE MEDIUM FOR GENERATING A DIVERSE SET OF TRAVEL OPTIONS

BACKGROUND

This invention relates to travel planning systems.

Computer travel planning systems such as airline computer reservation systems (E.G., Sabre®, Galileo®, Worldspan®, Amadeus®) used by airline reservation agents, human travel agents, and automated travel agents such as internet web sites Travelocity® and Expedia®, generally produce a relatively small set of recommended travel options for a query that has a route and/or time specification.

For air travel, usually the number of travel options that a travel planning system produces is much smaller than the total set that could possibly satisfy a traveller's request. For example, a CRS may respond to a round-trip query specified by a departure city and date and a return city and date with a set of 10 or so possible flight and fare combinations, even though there may be thousands of combinations of flights that satisfy the request.

In many cases, resource limitations prevent a travel planning system from analyzing or generating more than a small set of travel options. Moreover, for air travel it may be that for each option the system needs to query airlines about seat availability. The availability process places practical limits the number of options that may be considered.

SUMMARY

If a travel planning system is limited in the number of options it can generate, it may be desirable that the travel planning system consider or generate a diverse set of travel options. The planning system can maximize its chance of generating a good option by enforcing diversity in the set of options generated.

According to an aspect of the present invention, a method for providing a set of travel options includes reducing a larger set of travel options to a smaller set of diverse travel options.

According to an additional aspect of the present invention, a method for reducing a larger set of travel options to a smaller set of diverse travel options includes generating one or more travel options that are best for each of a set of travel preference functions.

According to an additional aspect of the present invention, a method generating a diverse list of N travel options Rts from a larger list of travel options Ts, includes generating a prioritized ordered list of requirements Rs and sorting the list of travel options Ts by an ordering function F to produce a best-first ordered list Ts2 with the list of options being optimized travel options for a set of travel requirements R in accordance with the ordering function F.

According to an additional aspect of the present invention, a travel planning system that outputs a set of travel options smaller than a complete set of travel options that the server has computed by pruning the larger set of options to a smaller set with a diversity-based pruning process.

One or more of the following advantages may be provided by one or more aspects of the invention.

The diversity process in the air travel planning system generates answers on several different airlines, thus the system is capable of satisfying a greater ranger of travellers. Similarly, an air travel planning system that queries airlines about whether there are seats available on a limited number of flights may wish to choose flights at a diversity of flight times, in case flights at particular times of day are all full.

DESCRIPTION

Figure 1:
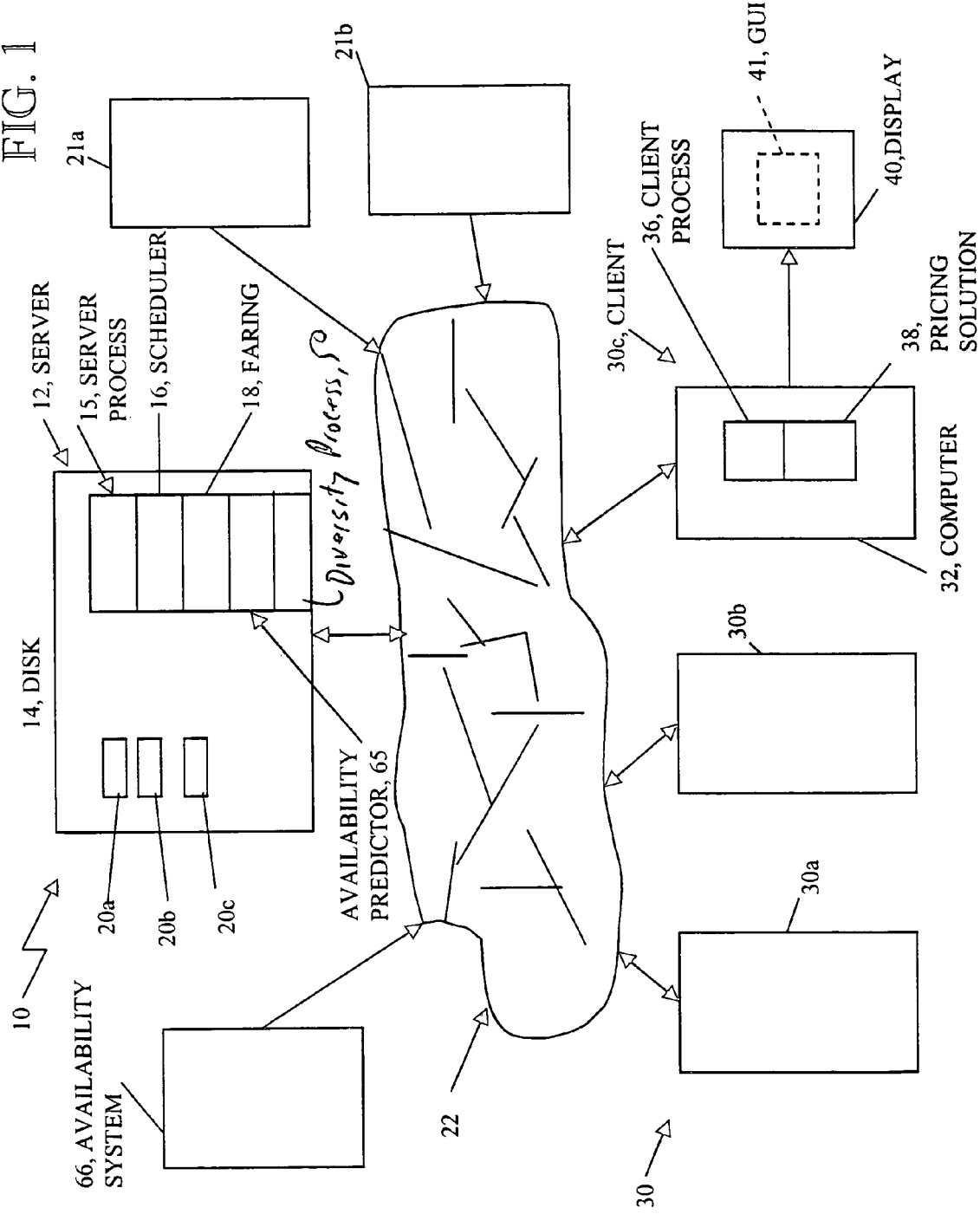
FIG. 1 is a block diagram of an travel planning system.

Referring now to FIG. 1, a travel planning system 10 is shown. The travel planning system can be used with various forms of travel such as airline, bus and railroad and is particularly adapted for air travel. It includes a server computer 12 having a computer memory or storage media 14 storing a server process 15. The server process includes a scheduler process 16 and a faring process 18. The scheduler process 16 is any suitable scheduler process that will produce from a travel request sets of flights that can satisfy the request. The faring process 18 is a process that determines a set of valid fares, preferrable the faring process 18 links the set of valid fares to the sets of flights to form a pricing solution. The server process 15 can be configured to produce other travel-related information as a result of a user query. For example, the server process 12 can produce routes or airline suggestions, optimal travel times and suggestions for alternative requests.

The travel planning system 10 also includes a plurality of databases 20a, 20b which store industry-standard information pertaining to travel (e.g., airline, bus, railroad, etc.). For example, database 20a can store the Airline Tariff Publishing Company database of published airline fares and their associated rules, routings and other provisions, the so-called ATPCO database. Database 20b can be an inventory of current availability of airline information for a particular carrier and so forth. The databases 20a-20b are typically stored locally and updated periodically by accessing remote resources 21a, 21b that maintain the respective databases.

The system 10 also includes a plurality of clients 30a-30c implemented by terminals or preferably personal computers. The clients include monitors 40 to display travel options generally through a graphical user interface implemented as a web page, and so forth. The clients 30a-30c are coupled to the server 12 via a network 22, which is also used to couple the remote resources 21a-21b that supply the databases 20a-20b to the server 12. The network 22 can be any local or wide area network or an arrangement such as the Internet. Typically, in response to a query from a client station, the server 12 will generate a list of travel options. The server or the client or an intermediate computer includes a diversity process 50 (as will be further discussed below) to insure that if the list of travel options is relatively long, a diverse set of those travel options will be displayed on the client systems 30. The client can include a client process 36 and is fed a diverse set of travel options from a larger set 26 that is determined by the server 12.

Figure 2:
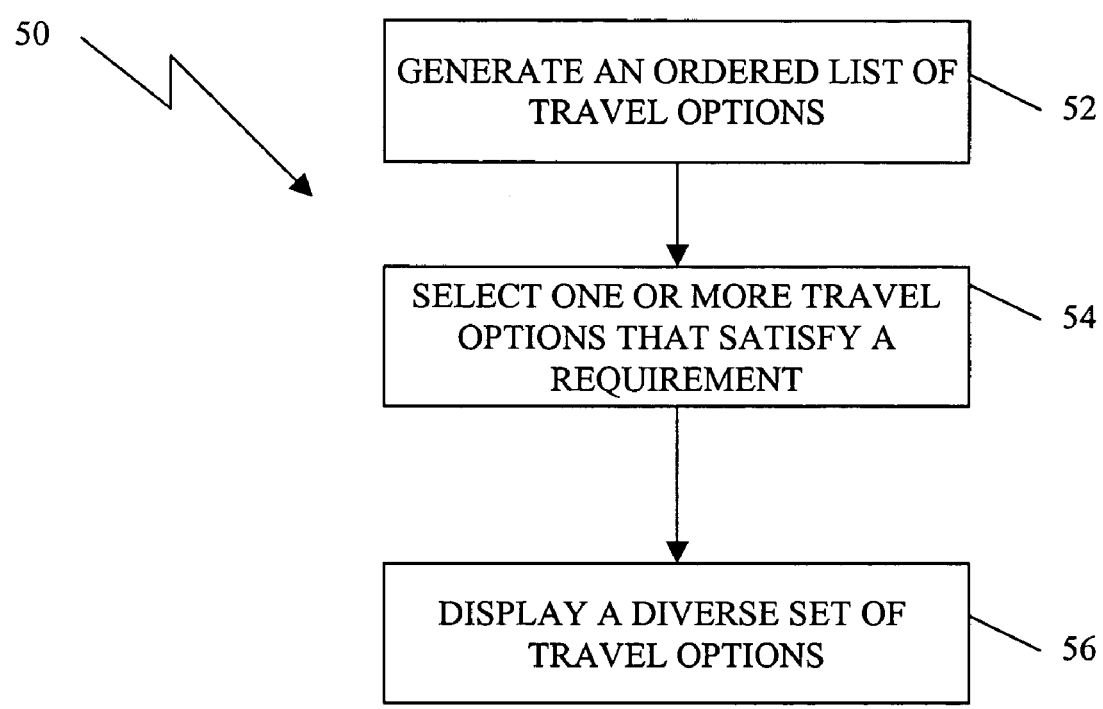
FIG. 2 is flow chart of a diversity process for selecting a diverse set of travel options.

Referring to FIG. 2, a diversity process 50 for selecting a diverse set of travel options from a larger set of candidate travel options is shown. The diversity process includes generating 52 an ordered list of travel requirements that represent conditions possibly required for a travel option to be the best travel option to generate. The diversity process 50 selects 54 for each travel requirement the one or more travel options that satisfy the requirement preferably by choosing those travel options that best satisfy one or more travel preference functions that can be used to order travel options.

For example, the air travel planning system generates the following 10 travel requirements for a set of travel options that each include one or more flights.

1. <none>
2. all flights on American Airlines.
3. all flights on United Airlines.
4. non-stop.
5. departing in morning.
6. departing in evening.
7. non-stop on American Airlines.
8. non-stop on United Airlines.
9. non-stop in morning.
10. non-stop in evening.

The diversity process 50 for each of the requirements the planning system selects 54 from the large set of candidate travel options e.g., the cheapest travel option that satisfies the requirement. The cheapest option is generated; the cheapest options all on American Airlines; the cheapest travel options all on United Airlines; the cheapest travel options that are non-stop; and so forth. These travel options are displayed 56 to provide a traveller a desirable option even if the traveller has restrictions on the times the traveller can travel, or preferences for one airline over another. These options are possible more desirable than if the system had merely generated and sent the 10 cheapest solutions without regard to producing a diverse set of solutions taking into consideration preferences of the traveller.

Figure 3:
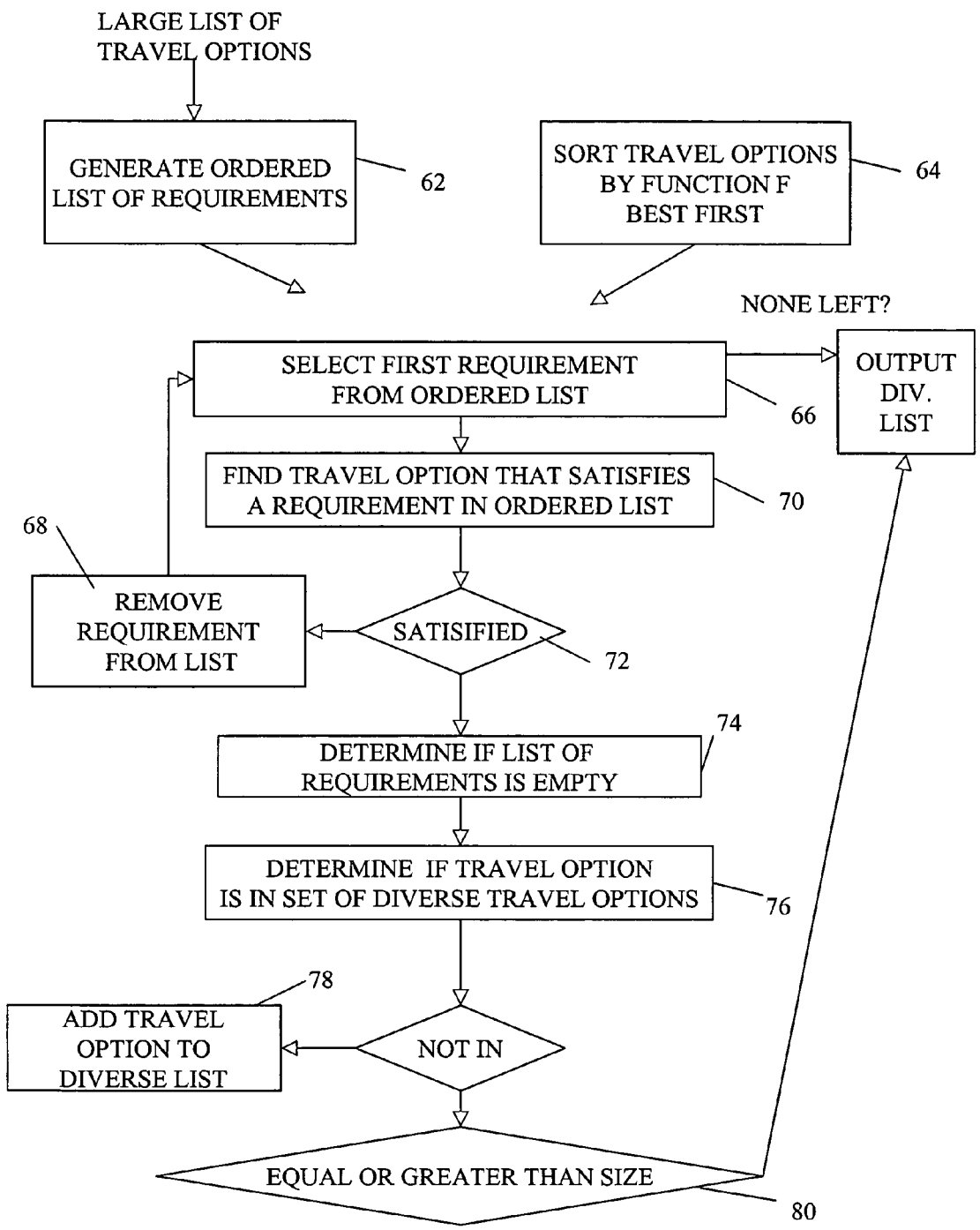
FIGS. 3 and 3A are flows chart depicting an example of a diversity process.

Referring to FIG. 3, an example 60 of a diversity process 50 is shown. The diversity process 60 generates a diverse list of travel options from a larger set of travel options. The diversity process iterates through a set of travel requirements and selects the best travel option for each requirement. The diversity process 60 can include an optional process that may improve efficiency in some cases by eliminating more-restrictive travel requirements that are satisfied by solutions selected for less-restrictive travel requirements.

For example, given the ordered travel requirements in the list above, if the cheapest travel option selected for the travel requirement "all flights on American Airlines" happens to be a non-stop option, then the travel requirement "non-stop on American Airlines" is removed from the list of travel requirements to be satisfied, since the same travel option selected for the first requirement will be the best for the second more-specific requirement. This is only applied if the all restrictions in the first requirement are also found in the second requirement.

The diversity process 60 thus includes a procedure for generating a diverse list of (N) travel options (Rts) from a larger list of travel options (Ts), that are the best travel options for a set of travel requirements (R), as defined by an ordering function F. The diversity process 60 generates 62 an prioritized (ordered) list of requirements Rs, and sorts 64 the list of travel options (Ts) by function (F) to produce a best-first ordered list (Ts2). The diversity process 60, initializes the list of result travel options (RTs) to be empty. If the remaining list of requirements (Rs) is empty 6, the process 60 returns an ordered list of diverse travel options (Rts). Otherwise, the diversity process selects 66 the first travel requirement (R) from the ordered list of requirements (Rs) and removes 68 a requirement (R) from the requirement list (Rs). The diversity process 60 find 70 a first (e.g., best) option T in the best-first ordered list (Ts2) that satisfies travel requirement (R).

If no option in the best-first ordered list (Ts2) satisfies 72 the requirement (R), the process 60 goes to check 74 if the remaining list of requirements (Rs) is empty. Otherwise, the diversity process determines 76 if a travel option T is not already in result travel options list (Rts). If the option T is not in the list (Rts), the diversity process adds 78 the travel option T to end of the result travel option list (Rts). If the size of the travel option list (RTs) is equal to or greater than N 80 the process returns the ordered list of diverse travel options.

Figure 3A:
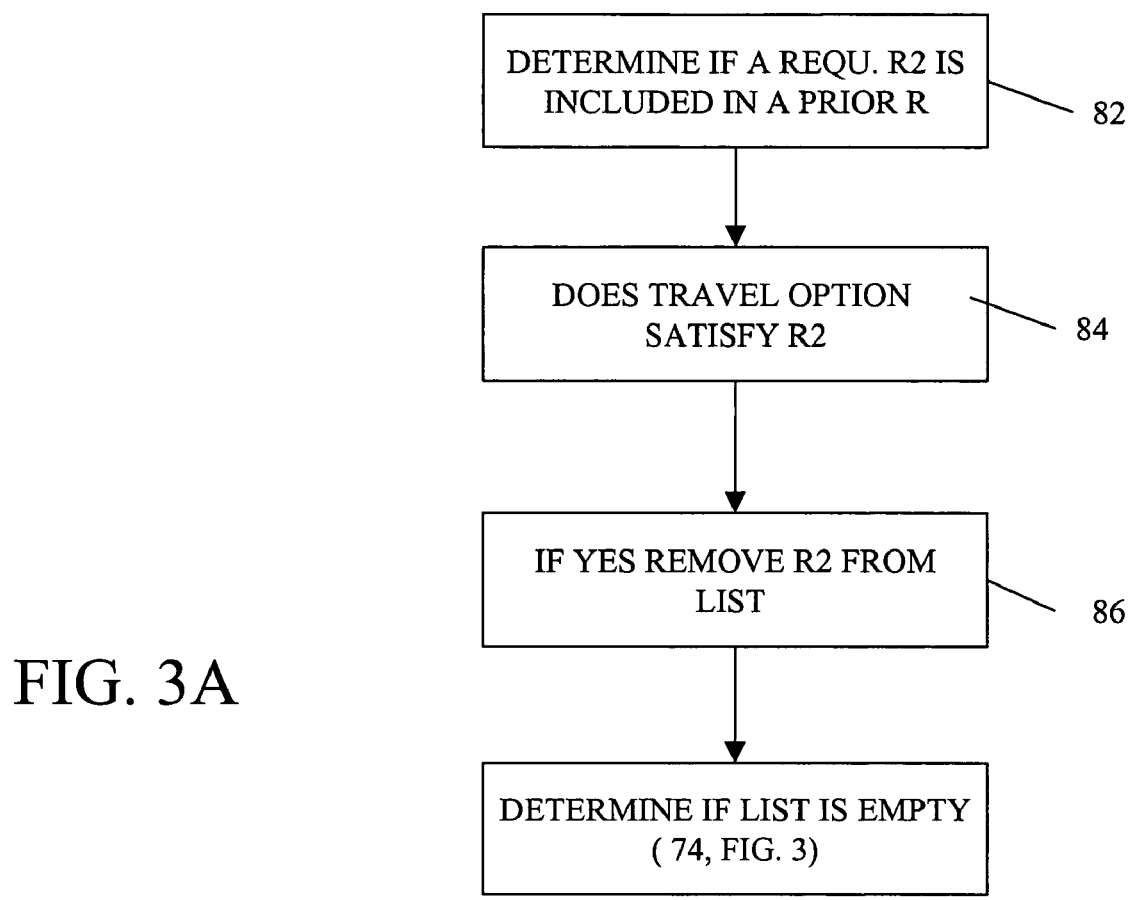

Referring to FIG. 3A, the diversity process 60 could optionally determine 82 for a travel requirement (R2) in the set of travel requirements (Rs), whether the requirement (R2) is included in a prior requirement (R), and whether the travel option T also satisfies 84 the requirement (R2). If the travel option T satisfies the requirement (R2), the process 60 can remove 86 the requirement R2 from the requirement list (Rs) and return to determine 74 (FIG. 3) if the remaining list of requirements is empty.

Figure 4:
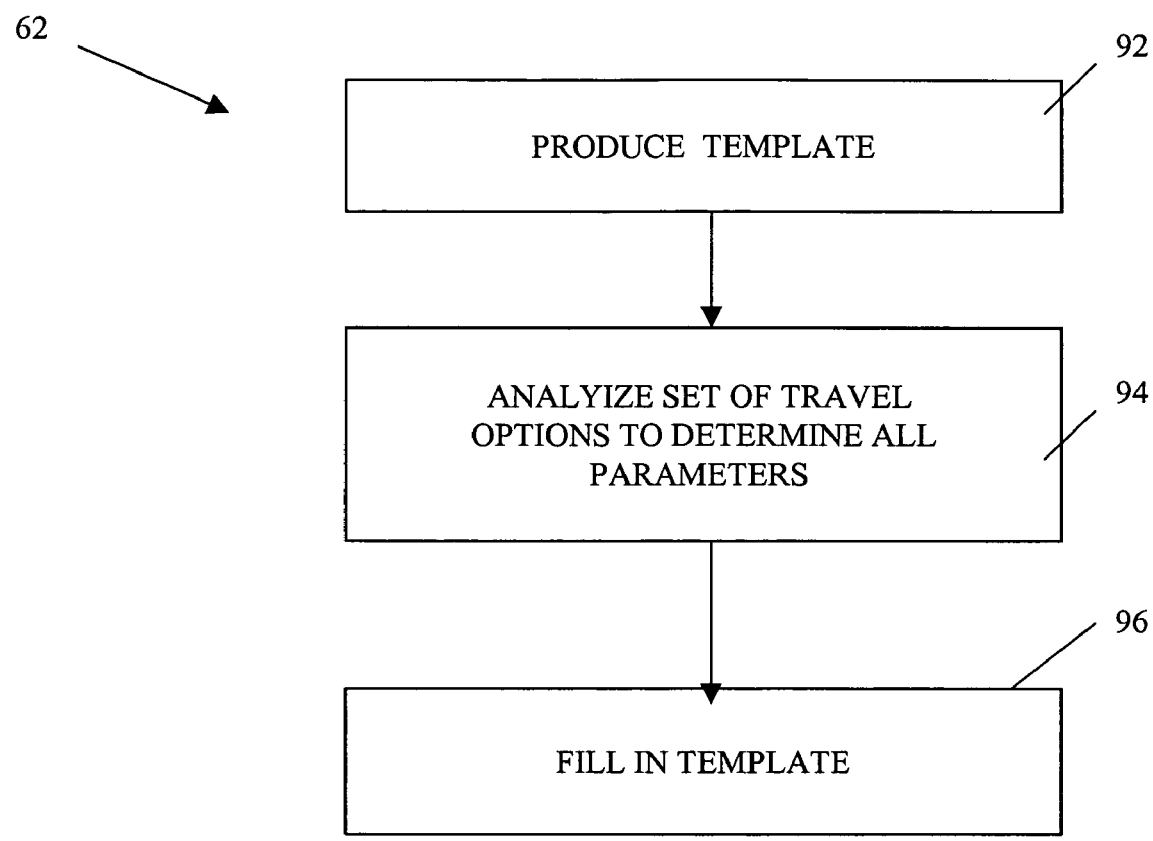
FIG. 4 is a flow chart of a process to generate a prioritized list of travel requirements for the diversity process of FIG. 3.

Referring to FIG. 4, the process 62 to generate a prioritized list of travel requirements is shown. The list may be a fixed list, for example the list of ten requirements in the example above. Alternatively, the list may be generated taking into account the number of solutions required, the ordering function, and the large set of candidate travel options. For example, the list may be generated 62 by filling 92 in a set of template requirements. A sample set of templates for air travel is 1. no requirement.
2. all flights on <airline>
3. non-stop.
4. outbound departure in <morning or afternoon or evening>.
5. return departure in <morning or afternoon or evening>.
6. outbound departure date <date>.
7. return departure date <date>.
8. non-stop on <airline>.
9. outbound departure date <date1> and return departure date <date2>.

The large candidate set of travel options may be analyzed 94 to find all parameters e.g., airlines found in any travel option, all departure dates for outbound and return, and all departure parts-of-day (morning, afternoon, evening) for outbound and return. The ordered list of requirements is generated by filling 96 in for each template all airlines, dates and parts-of-day present in the options.

The diversity process 60 can be run more than once with different travel option preference functions (a set of F's). For example, a travel planning system may output a diversity of travel options that include diverse options that are cheap and diverse options that are convenient, reflecting uncertainty in whether a traveller is cost-sensitive or convenience-sensitive.

Figure 5:
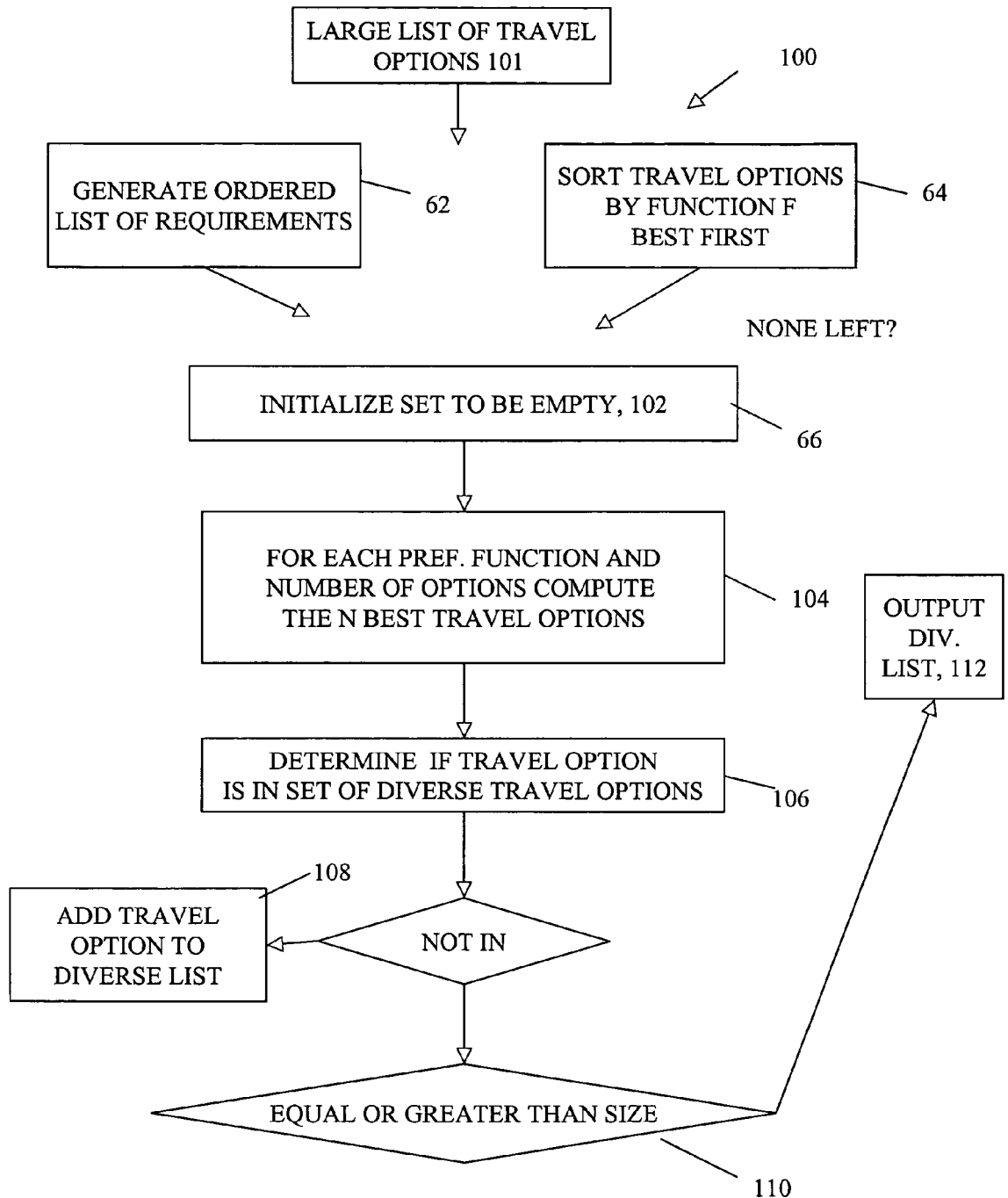
FIG. 5, is a flow chart of an alternative diversity process to generate a diverse set of travel options from a larger set of travel options.

Referring to FIG. 5, an alternative diversity process 100 to generate a diverse set of travel options from a larger set of travel options is shown. The alternative diversity process 100 generates the best one or more travel options as defined by each of a set of different travel preference functions. The alternative diversity process 100 defines a set of travel preference functions with each function capable to order travel options. In one example, the set might include "cheapest", "quickest", and "most-convenient" where each is a function that assigns a numerical score to a complete travel option (such as price, total-trip-time, and total trip-time with penalties for stops). Functions that assign numerical values based on combinations of cost and convenience are possible, such as functions that weigh both price and time.

Given set of travel options Ts 101, a set of preference functions Fs, and a desired number of answers for each preference function Ns, the alternative diversity process 100 returns a reduced set of diverse travel options Rts. The alternative diversity process initializes 102 a list of result travel options RTs to be empty and for each preference function F in the set of preference functions Fs and number of travel options (N) in the set of desired number of answers in each preference function (Ns), the alternative diversity process 100 computes 104 the N best travel options in Ts as defined by F. For each travel option T, unless the travel option T is in the set of diverse travel options Rts 106, the alternative diversity process 100 adds 108 the travel option T to the set of diverse travel options Rts checks 110 the number of options. The alternative diversity process 100 outputs 112 the diverse set of travel options (RTs).

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. For example the process could be implemented when pricing solutions are represented in pricing graph.

A computer travel planning system that outputs a diversity of travel options may be built by combining a travel planning system that transmits a larger set of solutions to a second computer system that reduces the set of travel options using diversity procedures as described above.

The large set of candidate travel options is represented as a list. Other representations are possible. For example, the set of travel options may be represented by a data structure that stores a large set of travel options by representing permitted combinations of smaller travel option components such as airline flights and fares. In such cases the travel option selection process above may be implemented using a more complicated operation than searching through an ordered list. With the pricing-graph the process for finding the best travel option that satisfies a travel requirement may be implemented for a representation that expresses travel options in terms of permitted combinations of smaller travel option components by disabling option components inconsistent with the requirement. The process applys an algorithm that extracts the best solution from the pricing graph representation. The diversity process calls an enumeration function, as described above, to enumerate all of the valid pricing solutions from the pricing graph that are remaining after the diversity process selectively invalidated nodes in the graph are inconsistent with the travel requirements.

What is claimed is:

1. A method for providing a set of diverse travel options, the method comprising:
    reducing a larger set of travel options to a smaller set of diverse travel options in accordance with diverse travel requirements that represent conditions for a travel option to be considered for inclusion in the set of diverse travel options that includes at least first and second travel options that satisfy first and second travel requirements, with the first and second travel requirements representing different values in a category of travel requirements, and the travel options including a flight and fare combination; and
    wherein reducing a larger set of travel options to a smaller set of diverse travel options further comprises:
    evaluating for the travel requirements a set of travel preference functions used to order the larger set of travel options.

2. The method of claim 1 wherein reducing a larger set of travel options to a smaller set of diverse travel options comprises:
    generating one or more travel options consistent for each of the diversity of travel requirements.

3. The method of claim 1 wherein reducing a larger set of travel options to a smaller set of diverse travel options comprises:
    generating one or more desired travel options consistent with diversity of travel requirements.

4. The method of claim 1 wherein reducing a larger set of travel options to a smaller set of diverse travel options further comprises:
    generating one or more of the best travel options consistent with a diversity of travel requirements where the travel requirements are dependent on the original set of travel options.

5. The method of claim 1 wherein the set of travel requirements includes requirements for different airlines.

6. The method of claim 1 wherein the set of travel requirements includes requirements for travel times of day, travel dates, numbers of stops, arrival pr departure airports, and cabin class.

7. The method of claim 1 wherein the set of travel requirements includes requirements that are combinations of other requirements.

8. The method of claim 7 wherein the set of travel requirement combinations include outbound and return travel dates or times of day.

9. The method of claim 7 wherein the set of travel requirements combinations include airlines and number of stops, arrival and departure airports.

10. The method of claim 7 wherein the set of travel requirements combinations include airlines and number of stops, arrival and departure airports.

11. The method of claim 1 wherein the method reduces a larger set of travel options to a smaller set of diverse travel options in accordance with travel requirements in the ordered list of travel requirements.

12. The method of claim 1 wherein the travel requirements represent conditions for a travel option to be considered for inclusion in the diverse list of travel options Rts.

13. The method of claim 1 wherein the set of travel requirements includes requirements for different airlines.

14. The method of claim 1 wherein the set of travel requirements includes requirements for travel times of day, travel dates, numbers of stops, arrival pr departure airports, and cabin class.

15. The method of claim 1 wherein the set of travel requirements includes requirements that are combinations of other requirements.

16. The method of claim 15 wherein the set of travel requirement combinations include outbound and return travel dates or times of day.

17. A computer implemented method for generating a diverse list of travel options Rts from a larger list of travel options Ts, the method comprises:
    generating a prioritized ordered list of requirements Rs;
    sorting the list of travel options Ts by an ordering function F to produce a best-first ordered list Ts2;

selecting a travel requirement R1 from the list of requirements Rs;
identifying a travel option T1 in the ordered list Ts2 that satisfies the travel requirement R1 that represents a value in a category of travel requirements;
adding the travel option T1 to the diverse list of travel options Rts;
selecting a second travel requirement R2 from the list of requirements Rs;
identifying a travel option T2 in the ordered list Ts2 that satisfies travel requirement R2 that represents a different value in the category of the first travel requirement R1; and
adding the travel option T2 to the diverse list of travel options Rts.

18. The method of claim 17 further comprising:
initializing the list of result travel options Rts to be empty; and if the remaining list of requirements Rs is empty, returning an ordered list of diverse travel options Rts.

19. The method of claim 18 further comprising:
initializing the list of result travel options Rts to be empty; and if the remaining list of requirements Rs is not empty,
selecting a first travel requirement R from the ordered list of requirements (Rs); and
removing a requirement R from the requirement list (Rs).

20. The method of claim 19 further comprising:
determining for each travel requirement R2 and Rs, whether the requirement R2 includes a requirement R, and T satisfies R2, and if T satisfies R2;
removing R2 from Rs.

21. The method of claim 19 further comprising:
finding a first option T in a best-first ordered list (Ts2) that satisfies travel requirements R.

22. The method of claim 21 further comprising:
determining whether any option in the Ts2 satisfies the travel requirement.

23. The method of claim 22 wherein if no option in Ts2 satisfies R, the method further comprises:
checking if the remaining list of requirements Rs is empty.

24. The method of claim 23 wherein if the diversity process determines if a travel option T is not already in the result list Rts,
adding the travel option T to end of the result travel option list Rts; and
determining if the size of the travel option list Rts is equal to or greater than N the process in order to return the ordered list of diverse travel options.

25. A travel planning system comprising:
a computer system; including:
a computer readable medium storing a computer program product comprising instructions to cause the computer system to:
output a set of travel options, smaller than a complete set of travel options that the computer has computed, by instructions to:
prune the complete set of travel options to a smaller set with a diversity-based pruning process, the diversity-based pruning process produces at least one travel option in the smaller set that satisfies a first travel requirement and at least one other travel option in the smaller set that satisfies a second travel requirement, with the first and second travel requirements representing different values in a category of travel requirements with the values for the travel requirement based on the set of travel options.

26. The travel planning system of claim 25 wherein the diversity-based pruning process comprises instructions to cause the system to:
generate a diverse list of N travel options Rts from a larger list of travel options Ts,
generate a prioritized ordered list of requirements Rs; and
sort the list of travel options Ts by an ordering function F to produce a best-first ordered list Ts2 with the list of options being optimized travel options for a set of travel requirements R in accordance with the ordering function F.

27. The travel planning system of claim 26 further comprising instructions to cause the system to:
initialize the list of result travel options Rts to be empty; and if the remaining list of requirements Rs is empty, return an ordered list of diverse travel options Rts.

28. The travel planning system of claim 27 further comprising instructions to cause the system to:
initialize the list of result travel options Rts to be empty; and if the remaining list of requirements Rs is not empty, select a first travel requirement R from the ordered list of requirements (Rs); and remove a requirement R from the requirement list (Rs).

29. A computer program product residing on a computer readable medium for generating a diverse list of travel options Rts from a larger list of travel options Ts, the computer program product comprises instructions for causing a computer to:
generate a prioritized ordered list of requirements Rs;
sort the list of travel options Ts by an ordering function F to produce a best-first ordered list Ts2;
select a travel requirement R1 from the list of requirements Rs;
identify a travel option T1 in the ordered list Ts2 that satisfies the travel requirement R1 that represents a value in a category of travel requirements;
add the travel option T1 to the diverse list of travel options Rts;
select a second travel requirement R2 from the list of requirements Rs;
identify a travel option T2 in the ordered list Ts2 that satisfies travel requirement R2 that represents a different value in the category of the first travel requirement R1; and
add the travel option T2 to the diverse list of travel options Rts.

30. The computer program product of claim 29 further comprising instructions to:
initialize the list of result travel options Rts to be empty; and if the remaining list of requirements Rs is empty, returning an ordered list of diverse travel options Rts.

31. The computer program product of claim 29 further comprising instructions to:
initialize the list of result travel options Rts to be empty; and if the remaining list of requirements Rs is not empty, select a first travel requirement R from the ordered list of requirements (Rs); and removing a requirement R from the requirement list (Rs).

32. The computer program product of claim 31 further comprising instructions to:
find a first option T in a best-first ordered list (Ts2) that satisfies travel requirements R.

33. The computer program product of claim 31 further comprising instructions to:
determine whether any option in the Ts2 list satisfies the travel requirement.

34. The computer program product of claim 33 wherein if no option in Ts2 satisfies R, the instructions further comprise instructions to: check if the remaining list of requirements Rs is empty.

35. The computer program product of claim 33 wherein if the instructions determine that a travel option T is not already in the result list Rts, add the travel option T to end of the result travel option list Rts; and determine if the size of the travel option list Rts is equal to or greater than N the process in order to return the ordered list of diverse travel options.

36. The computer program product of claim 33 further comprising instructions to:
   determine for each travel requirement R2 and Rs, whether the requirement R2 includes a requirement R, and T satisfies R2, and if T satisfies R2;
   remove R2 from Rs.

37. An article of manufacture having computer-readable program portions embodied therein for generating a diverse set of travel options, the article comprising instructions for causing a processor to:
   generate a first ordered set of travel options using a first preference function;
   select travel options from the first set, the selected travel options corresponding to a plurality of diverse travel requirements;
   generate a second ordered set of travel options using a second preference function, the second preference function being different from the first preference function;
   select travel options from the second set, the selected travel options corresponding to a plurality of diverse travel requirements; and
   combine the selected travel options to generate the diverse set of travel options.

38. The article of claim 37 further comprising instructions for causing a processor to generate a plurality of travel requirements,
   wherein the computer-readable program portion for selecting a predefined number of best travel options from the first set further comprises for each travel requirement, selecting one or more travel options from the first set that satisfy that travel requirement, and
   wherein the computer-readable program portion for selecting a predefined number of best travel options from the second set further comprises for each travel requirement, selecting one or more travel options from the second set that satisfy that travel requirement.

39. The article of claim 37 wherein values for a particular travel requirement are based on the candidate set of travel options.

40. The article of claim 37 wherein the plurality of travel requirement include particular carriers, number of stops, outbound travel departing in a predefined time period, return travel departing in a predefined time period, or travel with an outbound departure on a first predefined date and a return arrival on a second predefined date.

41. The article of claim 37 wherein values for the travel requirement of particular carriers with corresponding travel requirements include a first particular airline and a second, different particular airline.

42. An article of manufacture having computer-readable program portions embodied therein for generating a diverse set of travel options, the article comprising instructions for causing a processor to:
   determine a candidate set of travel options, the candidate set of travel options being based on user input;
   define a set of diversity requirements with instructions to define comprising instructions to:
   establish a plurality of travel requirement templates, for each travel requirement template, define a plurality of travel requirements, each of the travel requirements corresponding to a different value of the respective travel requirement template to produce the set of diversity requirements, and for each travel requirement in the set of diversity requirements,
   select from the candidate set of travel options a travel option that satisfies that travel requirement with values for a particular travel requirement template based on the candidate set of travel options;
   combine the selected travel options for the travel requirements to generate the diverse set of travel options; and
   display the diverse set of travel options to a user.

43. The article of claim 42 wherein values for a particular travel requirement template are based on the candidate set of travel options.

44. The article of claim 42 wherein the plurality of travel requirement templates include particular carriers, number of stops, outbound travel departing in a predefined time period, return travel departing in a predefined time period, or travel with an outbound departure on a first predefined date and a return arrival on a second predefined date.

45. The article of claim 44 wherein values for the travel requirement template of particular carriers with corresponding travel requirements include a first particular airline and a second, different particular airline.

* * * * *